United States Patent
Grewe et al.

(10) Patent No.: US 7,737,665 B2
(45) Date of Patent: Jun. 15, 2010

(54) MULTI-THRESHOLD CHARGING OF A RECHARGEABLE BATTERY

(75) Inventors: Anthony J. Grewe, Fogelsville, PA (US); Parag Parikh, Allentown, PA (US)

(73) Assignee: Agere Systems Inc., Allentown, PA (US)

( * ) Notice: Subject to any disclaimer, the term of this patent is extended or adjusted under 35 U.S.C. 154(b) by 218 days.

(21) Appl. No.: 11/916,717

(22) PCT Filed: Jun. 12, 2006

(86) PCT No.: PCT/US2006/022714

§ 371 (c)(1), (2), (4) Date: Dec. 6, 2007

(87) PCT Pub. No.: WO2006/135838

PCT Pub. Date: Dec. 21, 2006

(65) Prior Publication Data

US 2008/0212249 A1 Sep. 4, 2008

Related U.S. Application Data

(60) Provisional application No. 60/689,310, filed on Jun. 10, 2005.

(51) Int. Cl.
*H02J 7/04* (2006.01)
*H02J 7/16* (2006.01)
(52) U.S. Cl. .................................................. 320/150
(58) Field of Classification Search ................. 320/134, 320/137, 138, 150, 154, 160; 307/66
See application file for complete search history.

(56) References Cited

U.S. PATENT DOCUMENTS

| 5,477,127 | A | * | 12/1995 | Shiojima et al. | ............ 320/138 |
| 5,592,070 | A | | 1/1997 | Mino | ............ 320/35 |
| 5,623,195 | A | * | 4/1997 | Bullock et al. | ............ 320/153 |
| 7,525,291 | B1 | * | 4/2009 | Ferguson | ............ 320/164 |

(Continued)

FOREIGN PATENT DOCUMENTS

EP 0 409 214 A2 1/1991

(Continued)

*Primary Examiner*—Edward Tso
*Assistant Examiner*—Ramy Ramadan
(74) *Attorney, Agent, or Firm*—Mendelsohn, Drucker, & Associates, P.C.; Edward J. Meisarosh; Steve Mendelsohn

(57) ABSTRACT

In a preferred embodiment, a battery charging system in the form of an integrated circuit (IC), incorporated in a consumer electronic device, has a charging controller, a charging current generator, a junction temperature sensor, and a device current monitor. The junction temperature sensor provides to the charging controller a measured junction temperature of the IC. The charging current generator utilizes fractional synthesis, which involves regulating the duty cycles of multiple current sources, to achieve increased current resolution. The charging controller regulates the charging current provided by the charging current generator based on the relation of the measured junction temperature to three or more threshold temperatures. The device current monitor provides to the charging controller information about the current utilization of the consumer electronic device, thus allowing the charging controller to determine the device non-charging current and give priority for available current to user applications running on the consumer electronic device.

17 Claims, 3 Drawing Sheets

U.S. PATENT DOCUMENTS

| | | | |
|---|---|---|---|
| 2003/0179529 A1 | 9/2003 | Huang et al. | 361/93.8 |
| 2005/0093488 A1 | 5/2005 | Hung et al. | 315/307 |
| 2005/0253634 A1* | 11/2005 | Wu | 327/157 |

FOREIGN PATENT DOCUMENTS

| | | |
|---|---|---|
| EP | 1 434 328 A2 | 6/2004 |
| EP | 1 691 583 A2 | 8/2006 |
| WO | WO 2005/022957 A1 | 3/2005 |

* cited by examiner

200

MULTI-THRESHOLD CHARGING OF A RECHARGEABLE BATTERY

This application claims the benefit of the filing date of U.S. provisional application No. 60/689,310, filed on Jun. 10, 2005, the teachings of which are incorporated herein by reference.

BACKGROUND OF THE INVENTION

1. Field of the Invention

The current invention relates to rechargeable battery systems, and more particularly, to systems and methods for controlling the charging of rechargeable batteries.

2. Description of the Related Art

Batteries are typically used in situations where steady electric current is needed but not readily available from a power line. Portable electronic devices, for example, are typically powered by batteries. Rechargeable batteries allow for the repeated use of the same batteries by recharging them. Although many rechargeable batteries are recharged in dedicated chargers, a growing number of electronic devices contain an integrated charger allowing for the recharging of the device's batteries while the batteries remain inside the device. Examples include mobile and handheld computers and portable music players. Advantages of recharging the batteries inside the electronic device in which they are used include that there is no need to remove and re-insert the batteries, which reduces the risks of losing the batteries or inserting them incorrectly, and there is no need for a separate battery charger, which reduces the number of items that need to be manufactured, packaged, and tracked together with the portable electronic device itself. Additionally, recharging the batteries inside the electronic device increases portability and mobility by reducing the components associated with the product that a user may need to carry when traveling or on the go.

Rechargeable batteries allow for bidirectional conversion between electrical and chemical energy, as opposed to non-rechargeable batteries which allow for only the conversion of chemical energy into electrical energy, but not vice versa. Chargers provide electrical current to rechargeable batteries, which convert the received electrical energy back into storable chemical energy. Rechargeable batteries typically have limited lifetimes. The lifetime and utility of a rechargeable battery depend on factors such as the battery type (e.g., battery chemistry, construction, and size), the way it is drained, and the way it is recharged. Providing too much current and continuing to charge after the battery is fully charged are actions likely to reduce the overall health of the battery.

The simplest chargers provide a relatively steady current to the battery. More advanced chargers provide more elaborate charging characteristics that can vary with one or more factors, such as time, battery voltage, battery type, battery current, battery impedance, and battery temperature. Such advanced functionality is typically provided by an integrated circuit (IC) controller.

SUMMARY OF THE INVENTION

In one embodiment, the invention is a battery charging system comprising a junction temperature sensor adapted to measure a junction temperature associated with the battery charging system, a charging current generator adapted to provide a charging current to a rechargeable battery, and a charging controller adapted to receive the measured junction temperature. If the measured junction temperature is less than a first threshold temperature, then the charging controller directs the charging current generator to increase the charging current at a first rate. Else, if the measured junction temperature is less than a second threshold temperature that is higher than the first threshold temperature, then the charging controller directs the charging current generator to increase the charging current at a second rate different from the first rate. Else, if the measured junction temperature is less than a third threshold temperature that is higher than the second threshold temperature, then the charging controller directs the charging current generator to decrease the charging current at a third rate. Else, if the measured junction temperature is greater than the third threshold temperature, then the charging controller directs the charging current generator to turn off the charging current.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Figure 1:
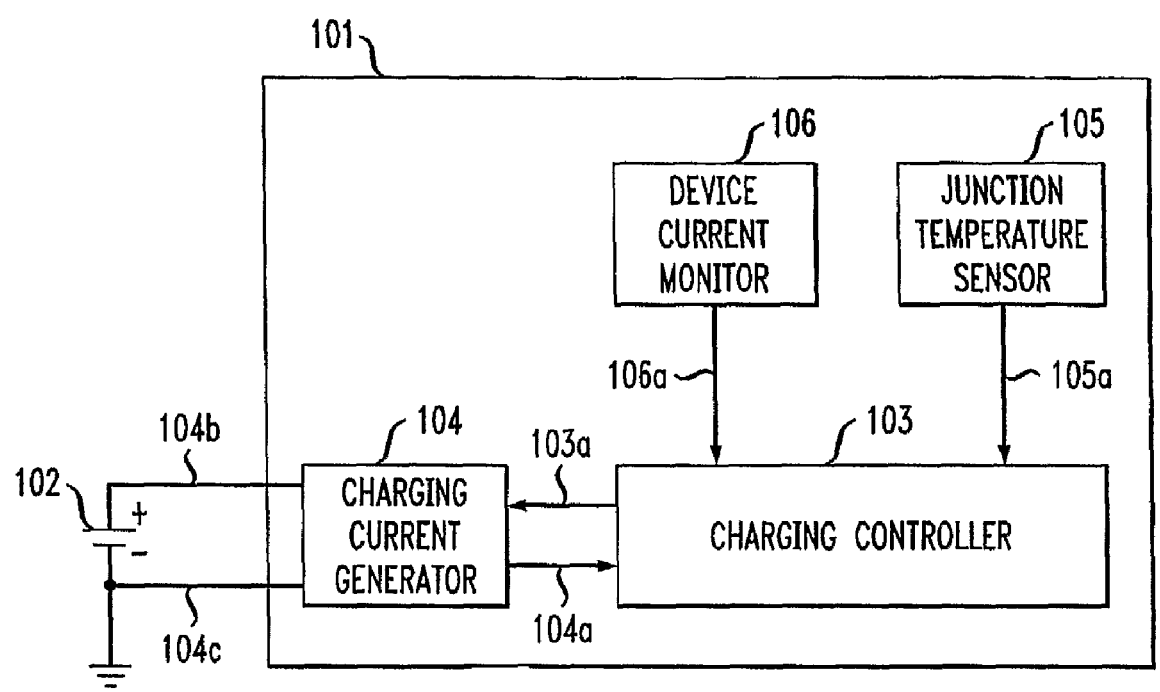
FIG. 1 shows a simplified block diagram of a battery charging system in accordance with an embodiment of the present invention.

FIG. 1 illustrates one embodiment of the present invention. FIG. 1 illustrates electronic device sub-system 100, which comprises battery charging system 101 and rechargeable battery 102. Electronic device sub-system 100 may, for example, be part of a portable consumer electronic device, such as a music player or a digital camera. Sub-system 100 may also be an independent device. Rechargeable battery 102 is preferably of a Li-ion type, but may be of any suitable rechargeable battery type. Charging system 101 comprises charging current generator 104, charging controller 103, junction temperature sensor 105, and optional device current monitor 106. Charging system 101 is preferably implemented on a monolithic IC.

Charging system 101 uses internal temperature sensing for automatic protection against overheating. Charging system 101 is preferably part of a power-management integrated circuit (PMIC) designed as a mixed-signal device with analog and digital sub-sections to support a portable media product application such as a media-player, digital camera, or a handheld or in-dash satellite radio receiver. The PMIC is adapted to provide a complementary set of power, battery, and reset management for portable consumer electronic applications. The features of the PMIC can be controlled by a host controller. The PMIC is adapted to use an intelligent interrupt system device mechanism to signal the host controller regarding power management events.

Charging controller 103 controls the charging current provided by charging current generator 104 to rechargeable battery 102 via lines 104b and 104c. Charging controller 103 indicates the desired current level via signal 103a. Charging current generator 104 may optionally provide feedback to charging controller 103 via signal 104a. The feedback provided via signal 104a may include the actual charging current provided by charging current generator 104. Charging controller 103 may receive other feedback information, such as battery statistics (e.g., battery temperature, current, or voltage), from any suitable source, for use in controlling the charging of battery 102.

Charging controller 103 receives information about the junction temperature of charging system 101 from temperature sensor 105 via signal 105a. The junction temperature is the temperature at a semiconductor junction in the IC used to implement charging system 101. Temperature sensor 105 can comprise one or more sensing elements preferably placed in or near the location or locations likely to become hottest. The measured junction temperature of an IC will typically rise from an increase in the currents flowing through the semiconductor junctions of the IC. The junction temperature may also be affected by the ambient temperature of the IC. ICs can be harmed by high temperatures and many ICs incorporate temperature sensors such as temperature sensor 105. A typical IC with a junction temperature sensor is programmed to shut itself down if the junction temperature reaches a particular temperature. Such a shutdown would likely prove disruptive to the operation of the device where the IC is located.

Charging system 101 employs extended threshold logic that monitors for at least three threshold temperatures. Charging controller 103 relies on the extended threshold logic in using the received temperature information to determine the current to be provided to battery 102 by charging current generator 104. Charging current generator 104 can provide charging current up to a ceiling charging current value. The ceiling charging current value is based on factors such as limitations of charging current generator 104, the properties of battery 102, and/or specification standards with which sub-system 100 is required to comply. Preferably, the ceiling charging current value is set to be the highest charging current that will efficiently recharge battery 102. The maximum charging current is a variable parameter that is used by charging current generator 104 for the charging of battery 102, and is set by charging controller 103, as discussed further below. The maximum charging current represents the peak current that may be allocated for charging battery 102 and can be set up to the ceiling charging current value.

If charging system 101 determines to start charging, then charging controller 103 steadily increases the charging current (at the "regular rate") to be provided by charging current generator 104, while monitoring the junction temperature provided by temperature sensor 105, in accordance with the extended threshold logic. As used herein, the threshold temperatures are numbered from lowest to highest. Under the extended threshold logic, if the highest threshold is reached, then the IC shuts down, while if only an intermediate threshold is reached, then the charging current is reduced. If only the lowest threshold is reached, then the charging current is increased at a reduced rate. If the junction temperature is below the lowest threshold, then the charging current is increased at the regular rate, up to the maximum charging current. Exemplary values for three threshold temperatures are 115° C. for threshold one, 125° C. for threshold two, and 150° C. for threshold three.

Figure 2:
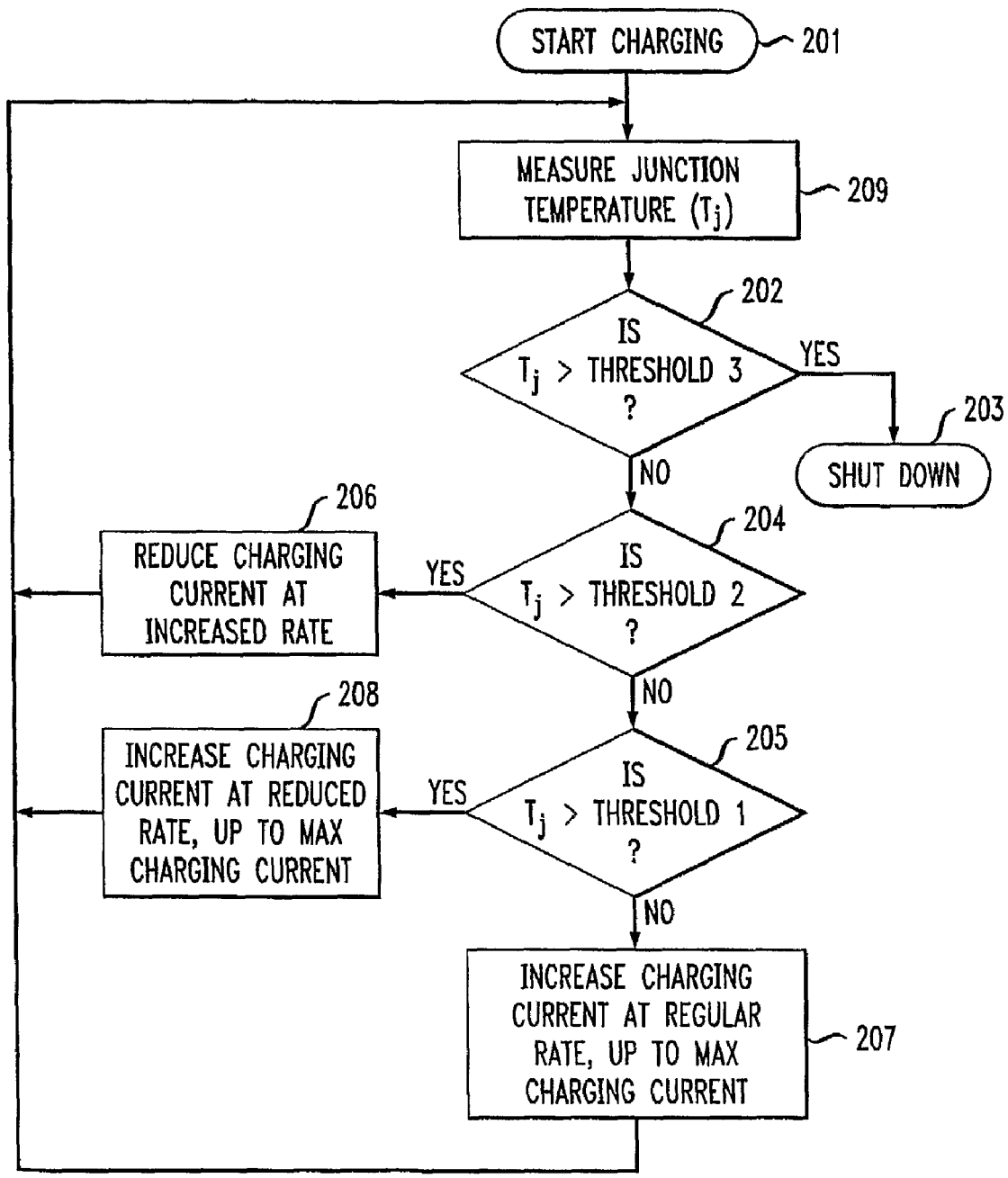
FIG. 2 shows a sample flowchart for the operation of the charging controller of FIG. 1, using information from the temperature sensor of FIG. 1.

FIG. 2 illustrates sample flowchart 200 for the operation of charging controller 103, based on information from temperature sensor 105. First, charging controller 103 determines that charging should start (step 201). The determination to start charging may, for example, be based on a command from a host controller that may monitor the conditions of battery 102 and power sources connected to a host device incorporating sub-system 100. After the charging process starts (step 201), charging controller 103 retrieves the present junction temperature value from temperature sensor 105 (step 209). Temperature sensor 105 is preferably located near the part of an integrated circuit that consumes the most power, or otherwise near the center of the integrated circuit. Temperature sensor 105 can comprise several individual sensors located to account for circuit geometry and/or power usage, in which case the temperature provided via signal 105a may be the highest temperature sensed by any of the individual sensors.

If charging controller 103 determines that the temperature is higher than threshold three (step 202), then the charging controller shuts down charging system 101 (step 203) and/or the entire IC on which it may be located. If the junction temperature is not higher than threshold three (step 202), then charging controller 103 determines whether the junction temperature is higher than threshold two (step 204). If the junction temperature is higher than threshold two (step 204), then charging controller 103 reduces the charging current (step 206), with a minimum of zero, and then returns to step 209, which is getting the junction temperature. The magnitude of a decrement in the charging current of step 206 is preferably larger than the magnitude of an increment of regular increase. Thus, for example, a regular rate of increase (step 207) could be an increment of 1 mA in 50 milliseconds, while a rate of decrease (step 206) could be a decrement of 5 mA in 50 milliseconds. These examples are for illustration only and not intended to limit the scope of the invention.

If the junction temperature is not higher than threshold two, then charging controller 103 determines whether the junction temperature is higher than threshold one (step 205). If the junction temperature is higher than threshold one (step 205), then charging controller 103 increases the charging current, up to the maximum charging current, at a reduced rate (step 208), and then returns to step 209, which is getting the junction temperature. An illustrative example of an increase in charging current at a reduced rate (step 208) could be an incremental increase of 0.5 mA in 50 milliseconds. If the junction temperature is not higher than threshold one (step 205), then charging controller 103 increases the charging current, up to the maximum charging current, at the regular increase rate (step 207), and then returns to step 209, which is getting the junction temperature.

If charging system 101 is part of an integrated product such as a consumer electronic device, then charging controller 103 can receive information about the device's utilization of current from device current monitor 106 via signal 106a. Device current monitor 106 can monitor the total current used by the consumer electronic device, which includes the charging current, or monitor only the current used by the consumer electronic device exclusive of the charging current. Charging controller 103 can use the value received via signal 106a and the value of the charging current to determine the total device current as well as the device non-charging current. This information can be useful for allocating current if the total current available to the consumer electronic device is limited, e.g., if the consumer electronic device is connected to a computer USB bus. This information allows the charging controller to dynamically modify the charging current in response to the device's other current demands, as indicated by the non-charging current level, such as current demands by one or more user applications. This dynamic response allows charging controller 103 to provide priority to the user applications, thereby proactively providing the user applications with the power they request. This helps promote more stable operation for user applications.

If based on the information from device current monitor 106, in one embodiment, charging controller 103 determines that the sum of the non-charging current and the maximum charging current value is at or approaching the available current limit, then charging controller 103 reduces the maximum charging current value, and if necessary, also reduces the charging current. Charging controller 103 may also reduce the rate of increase of the charging current. If device current monitor 106 indicates a decrease in the non-charging current used by the consumer electronic device, then the charging controller 103 may increase the maximum charging current value, up to the ceiling charging current, and may also raise the rate of increase of the charging current.

Figure 3:
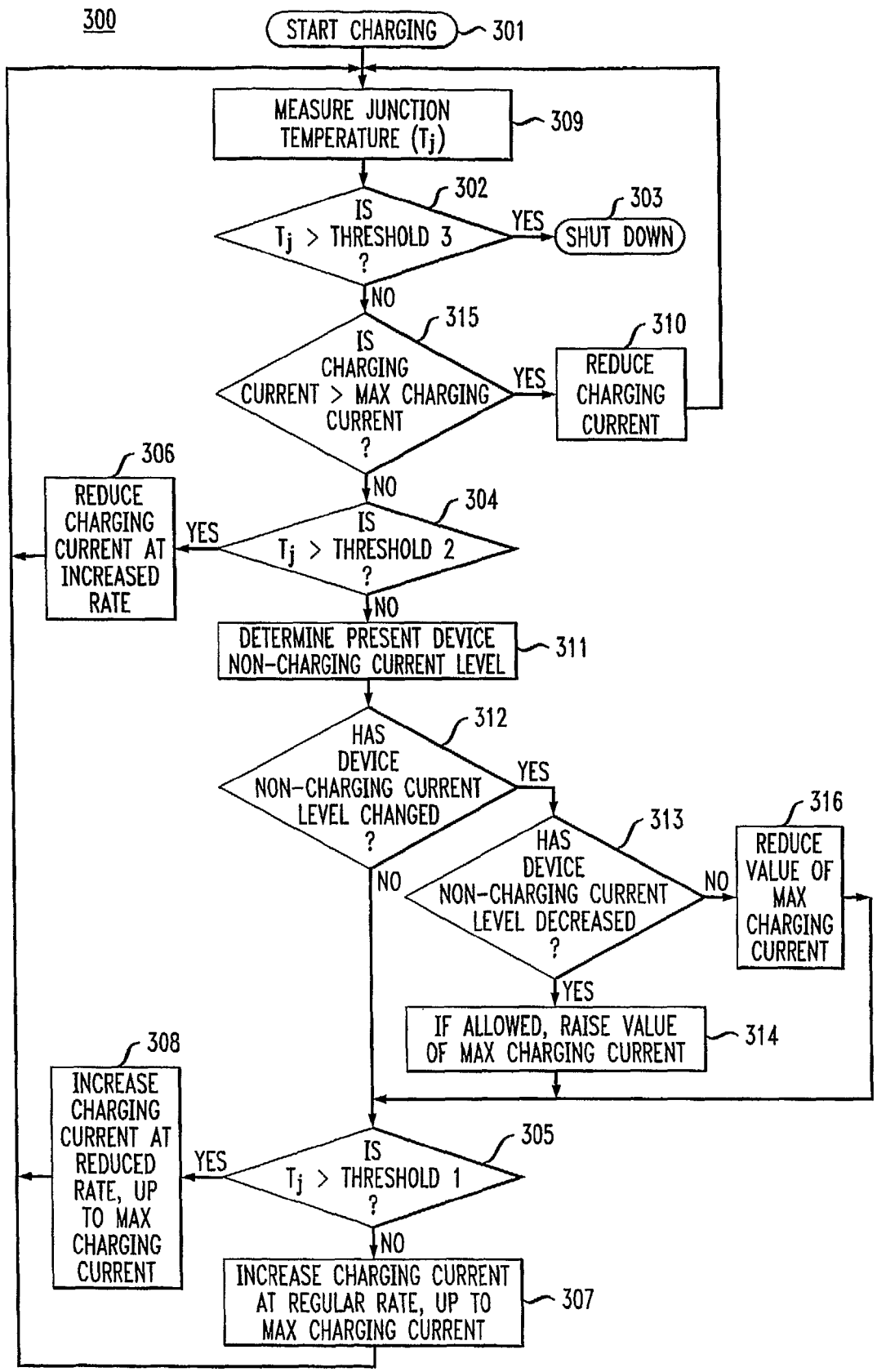
FIG. 3 shows a sample flowchart for the operation of the charging controller of FIG. 1, using information from the temperature sensor and the user current-utilization monitor of FIG. 1.

FIG. 3 illustrates sample flowchart 300 for the operation of charging controller 103 based on information from temperature sensor 105 and device current monitor 106. The device current and the junction temperature monitoring are done substantially in parallel, and so there are multiple ways to represent, order, and integrate the two processes. One such way is illustrated in FIG. 3. Steps that are similar to steps in flowchart 200 of FIG. 2 have a similar label, but with a different prefix.

First, charging controller 103 determines that charging should start (step 301). Following step 301, charging controller 103 receives signal 105*a* representing the junction temperature from junction temperature sensor 105 (step 309). Next, charging controller 103 determines whether the junction temperature is greater than threshold three (step 302), and if so, then charging controller 103 shuts down charging system 101 (step 303). If the junction temperature is not greater than threshold three (step 302), then charging controller 103 determines whether the charging current provided is greater than the maximum allowable charging current (step 315), which can occur if the maximum charging current value is reduced in step 316, below. If the charging current is greater than the maximum charging current (step 315), then charging controller 103 reduces the charging current (step 310), and then returns to step 309. The reduction of the charging current in step 310 can be a reduction to the maximum charging current in one continuous step, or the reduction could be an incremental reduction followed by step 309, similar to the way the charging current reduction is performed in step 306 (see below). In the latter case, step 306 can be substituted for step 310.

If the charging current is not greater than the maximum charging current (step 315), then charging controller 103 determines whether the junction temperature is higher than threshold two (step 304), and if so, then charging controller 103 reduces the charging current, at an increased rate (step 306), with a minimum of zero, and then returns to step 309. If the junction temperature is not higher than threshold two (step 304), then charging controller 103 determines the non-charging current used by the consumer electronic device (step 311), and then whether the device non-charging current level has changed, by more than a specified current-change threshold, from its previous level (step 312).

If the device non-charging current level has not changed (step 312), then charging controller 103 determines whether the junction temperature is higher than threshold one (step 305), and if so, then charging controller 103 increases the charging current, up to the maximum charging current, at a reduced rate (step 308), and then returns to step 309. If the junction temperature is not higher than threshold one (step 305), then charging controller 103 increases the charging current, up to the maximum charging current, at the regular increase rate (step 307), and then returns to step 309.

If the device non-charging current level has sufficiently changed (step 312), then charging controller 103 determines whether the device non-charging current level has sufficiently decreased (step 313), and if so, then charging controller 103 raises the value of the maximum charging current by the magnitude of decrease, up to the ceiling charging current (step 314), and then goes to step 305. If the device non-charging current level has not decreased (step 313), i.e., if the device non-charging current level has sufficiently increased (steps 312 and 313), then charging controller 103 reduces the value of the maximum charging current by the magnitude of the increase, with a limit of zero (step 316), and then goes to step 305.

In an exemplary implementation, charging controller 103 would return to performing step 309 about every 50 milliseconds. It should be noted that because of the continuous cycling, monitoring, and incrementing as exemplified by flowcharts 200 and 300, references to the term "rate" may be interchangeable with the term "increment." Thus, for example, an increase of the charging current at a rate of 1 mA in 50 milliseconds is substantially equivalent to an increase of the charging current by an increment of 1 mA if charging controller 103 obtains a new junction temperature measure (e.g., steps 209 or 309) and performs the subsequent tests (e.g., steps 202 or 302) every 50 milliseconds.

Using the enhanced threshold and the dynamic response described above, charging system 101 can efficiently recharge battery 102 while dynamically providing the user applications the power they need, thus reducing system noise.

A typical current source provides a few current values, and thus limited current resolution. In an exemplary implementation, charging current generator 104 comprises a digital current source (not shown) which can provide currents of 500 mA (e.g., the ceiling current), 250 mA, and 125 mA, as well as no current (i.e., a current of 0 mA). However, charging controller 103 may require the provision of current at increments of fractions of milliamps and precise intermediary current values. Charging current generator 104 can provide the required current resolution by using fractional synthesis. Fractional synthesis is the modulating of the duty cycles of the available currents that are above and below the desired current, at a ratio that will provide the desired current. Fractional synthesis provides, in other words, time-based interpolation between available current levels.

The relative duty cycles may be calculated mathematically. The duty cycle fraction for the higher current is (desired current−lower current)/(higher current−lower current), and the duty cycle fraction for the lower current is (higher current−desired current)/(higher current−lower current). For example, using the above digital current source, if a current of 200 mA is desired, then the digital current source could provide 250 mA for ⅗ of a cycle and 125 mA for ⅖ of a cycle. Thus, if the digital current source of charging current generator 104 provides 250 mA for 30 milliseconds, and 125 mA for 20 milliseconds, then the average current for the 50 millisecond cycle would be 200 mA. Charging current generator 104 may comprise circuit elements, such as a capacitor, to smooth out the average current resulting from the fractional synthesis. Using fractional synthesis, virtually any current level between zero and the ceiling current can be provided.

In an alternative embodiment, charging system 101 is an independent charging device for charging battery 102.

In an alternative embodiment, junction temperature sensor 105 measures temperatures other than or in addition to semiconductor junction temperatures. Such additional temperatures include die temperature, lead temperature, package temperature, and/or board temperature. As such, the term "junction temperature" encompasses all such measured quantities. As would be appreciated by a person of ordinary skill in the art, using these alternative temperatures may require adjusting the threshold temperatures and logic in order to most appropriately respond to the temperature measurements.

In an alternative implementation, charging controller 103 utilizes more than three junction temperature thresholds. The additional thresholds allow for increased programming flexibility, wherein different temperature ranges, which are delineated by the thresholds, can define different particular modifications to the charging current and/or different rates of increase or decrease of the charging current, including a zero rate of change of the charging current. The additional thresholds and temperature ranges can be implemented by expanding the second threshold from a single temperature into a temperature range whose minimum value is above threshold one and whose maximum value is below threshold three, and which is divided into one or more sub-ranges. For each sub-range, charging controller 103 directs the charging current generator to regulate the charging current in a manner corresponding to the sub-range. For the ranges (i) below threshold one, (ii) between threshold one and the minimum of threshold two, (iii) between the maximum of threshold two and threshold three, and (iv) above threshold three, battery charging system 101 continues to operate as described above.

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, or general-purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence. Likewise, additional steps may be included in such methods, and certain steps may be omitted or combined, in methods consistent with various embodiments of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

We claim:

1. A battery charging system comprising:
    a junction temperature sensor adapted to measure a junction temperature associated with the battery charging system, wherein the junction temperature is indicative of the temperature at a semiconductor junction in an integrated circuit used to implement the battery charging system;
    a charging current generator adapted to provide a charging current to a rechargeable battery; and
    a charging controller adapted to receive the measured junction temperature, wherein:
    if the measured junction temperature is less than a first threshold temperature, then the charging controller directs the charging current generator to increase the charging current at a first rate;
    else, if the measured junction temperature is less than a second threshold temperature that is higher than the first threshold temperature, then the charging controller directs the charging current generator to increase the charging current at a second rate different from the first rate;
    else, if the measured junction temperature is less than a third threshold temperature that is higher than the second threshold temperature, then the charging controller directs the charging current generator to decrease the charging current at a third rate;
    else, if the measured junction temperature is greater than the third threshold temperature, then the charging controller directs the charging current generator to turn off the charging current.

2. The invention of claim 1, wherein the magnitude of the first rate is greater than the magnitude of the second rate.

3. The invention of claim 1, wherein the magnitude of the third rate is greater than the magnitude of the first rate.

4. The invention of claim 1, wherein:
    the magnitude of the first rate is greater than the magnitude of the second rate; and
    the magnitude of the third rate is greater than the magnitude of the first rate.

5. The invention of claim 1, wherein if the measured junction temperature is greater than the third threshold temperature, then the battery charging system turns off.

6. The invention of claim 1, wherein:
the second threshold temperature is a temperature range whose minimum temperature is higher than the first threshold and whose maximum temperature is lower than the third threshold;
the temperature range is divided into one or more sub-ranges; and
for each sub-range, the charging controller directs the charging current generator to regulate the charging current in a manner corresponding to the sub-range parameters.

7. The invention of claim 1, wherein the charging controller is adapted to limit the charging current to a variable maximum charging current not greater than a non-varying ceiling charging current for the charging current generator.

8. The invention of claim 7, further comprising a device current monitor, wherein the charging controller is adapted to:
determine a device non-charging current from information provided by the device current monitor; and
set the maximum charging current based on at least the device non-charging current.

9. The invention of claim 8, wherein:
the charging controller is adapted to track the device non-charging current over time;
if the device non-charging current increases by more than a first current threshold, then the charging controller reduces the maximum charging current based on the magnitude of the increase; and
if the device non-charging current decreases by more than a second current threshold, then the charging controller increases the maximum charging current based on the magnitude of the decrease.

10. The invention of claim 9, wherein:
the magnitude of the first rate is greater than the magnitude of the second rate; and
the magnitude of the third rate is greater than the magnitude of the first rate.

11. The invention of claim 10, wherein:
the charging current generator is adapted to provide two or more different current levels, wherein at least two of the different current levels are non-zero; and
the charging current generator is adapted to alternate multiple times between two of the different current levels based on a specified ratio in order to generate the charging current at a level between the two different current levels.

12. The invention of claim 1, wherein the charging current generator is adapted to generate the charging current level using fractional synthesis.

13. The invention of claim 12, wherein:
the charging current generator is adapted to provide two or more different current levels, wherein at least two of the different current levels are non-zero; and
the charging current generator is adapted to alternate multiple times between two of the different current levels based on a specified ratio in order to generate the charging current at a level between the two different current levels.

14. A method for charging a rechargeable battery, the method comprising:
measuring a junction temperature, wherein the junction temperature is indicative of the temperature at a semiconductor junction in an integrated circuit used to implement the method; and
providing a charging current to a rechargeable battery, wherein:
if the measured junction temperature is less than a first threshold temperature, then increasing the charging current at a first rate;
else, if the measured junction temperature is less than a second threshold temperature that is higher than the first threshold temperature, then increasing the charging current at a second rate different from the first rate;
else, if the measured junction temperature is less than a third threshold temperature that is higher than the second threshold temperature, then decreasing the charging current at a third rate;
else, if the measured junction temperature is greater than the third threshold temperature, then turning off the charging current.

15. Apparatus comprising:
means for measuring a junction temperature associated with the apparatus, wherein the unction temperature is indicative of the temperature at a semiconductor junction in an integrated circuit used to implement the apparatus;
means for providing a charging current to a rechargeable battery; and
means for receiving the measured junction temperature, wherein:
if the measured junction temperature is less than a first threshold temperature, then the receiving means directs the charging current generator to increase the charging current at a first rate;
else, if the measured junction temperature is less than a second threshold temperature that is higher than the first threshold temperature, then the receiving means directs the charging current generator to increase the charging current at a second rate different from the first rate;
else, if the measured junction temperature is less than a third threshold temperature that is higher than the second threshold temperature, then the receiving means directs the charging current generator to decrease the charging current at a third rate; and
else if the measured junction temperature is greater than the third threshold temperature, then the receiving means directs the charging current means to turn off the charging current.

16. The system of claim 1, wherein:
the junction temperature sensor is adapted to measure the junction temperature repeatedly, in a looped manner, to provide newly measured junction temperatures;
the charging controller is adapted to vary the charging current in response to a newly measured junction temperature independently of a present charging current.

17. The system of claim 11, wherein:
the specified ratio determines the respective duty cycle fractions for the two different current levels; and
the charging controller is adapted to calculate the specified ratio based on the two different current levels and a desired current level for the charging current that is between the two different current levels.

* * * * *